Jan. 29, 1952

G. L. SUNDBERG ET AL 2,583,612

PISTON RING GAPPING MACHINE

Filed April 17, 1948

5 Sheets-Sheet 1

INVENTORS:
GUSTAVE L. SUNDBERG
CHARLES A. MARIEN
BY Harry A. Beimee
ATTORNEY.

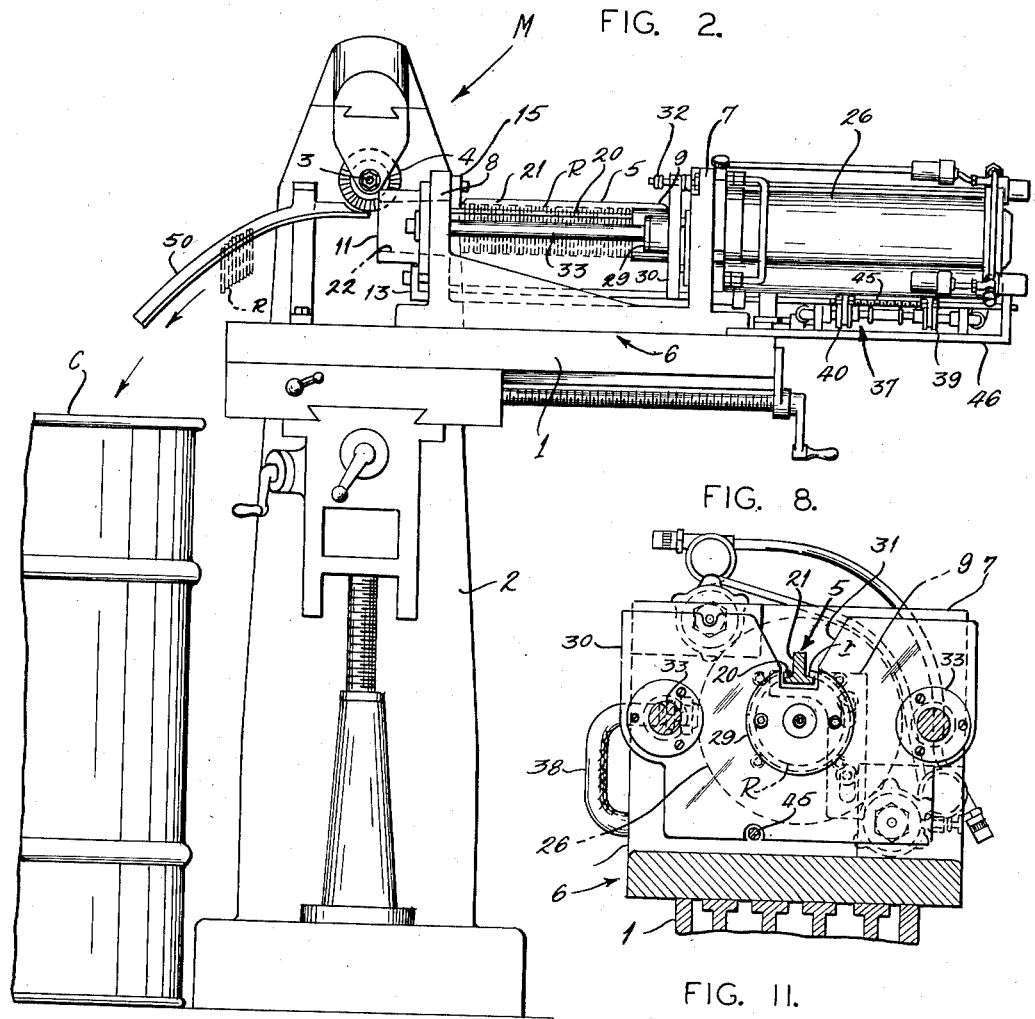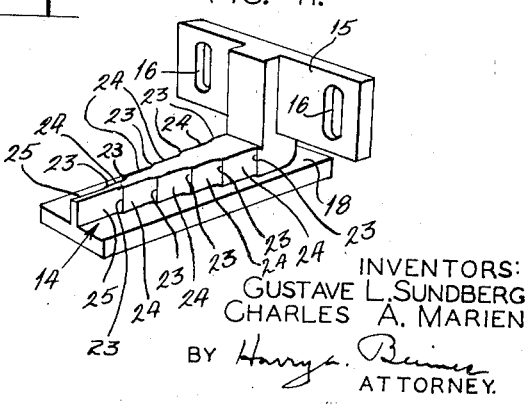

Jan. 29, 1952  G. L. SUNDBERG ET AL  2,583,612
PISTON RING GAPPING MACHINE
Filed April 17, 1948  5 Sheets-Sheet 3

INVENTORS:
GUSTAVE L. SUNDBERG
CHARLES A. MARIEN
BY Harry A. Bunner
ATTORNEY.

Jan. 29, 1952   G. L. SUNDBERG ET AL   2,583,612
PISTON RING GAPPING MACHINE
Filed April 17, 1948   5 Sheets—Sheet 4
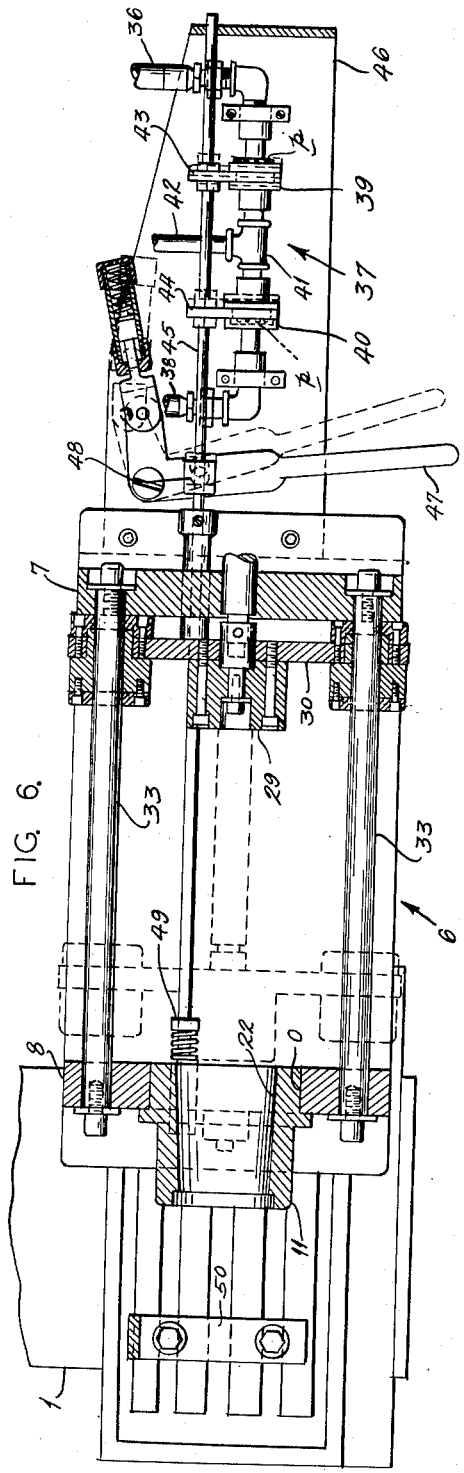
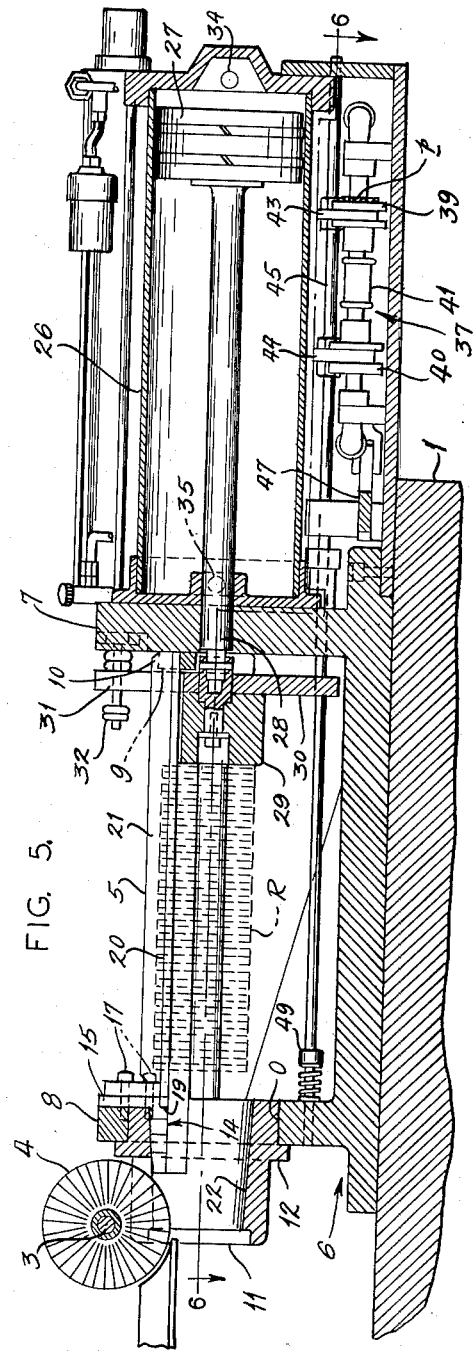
INVENTORS:
GUSTAVE L. SUNDBERG
CHARLES A. MARIEN
BY
ATTORNEY.

Jan. 29, 1952 G. L. SUNDBERG ET AL 2,583,612
PISTON RING GAPPING MACHINE
Filed April 17, 1948 5 Sheets-Sheet 5

INVENTORS:
GUSTAVE L. SUNDBERG
CHARLES A. MARIEN
BY Henry A. Brunner
ATTORNEY.

Patented Jan. 29, 1952

2,583,612

UNITED STATES PATENT OFFICE 2,583,612

PISTON RING GAPPING MACHINE

Gustave L. Sundberg, Muskegon, Mich., and Charles A. Marien, St. Louis, Mo., assignors to Ramsey Corporation, Wilmington, Del., a corporation of Delaware Application April 17, 1948, Serial No. 21,658

1 Claim. (Cl. 90—21)

Our invention has relation to improvements in piston ring gapping machines, and it consists in the novel features of construction more fully set forth in the specification and pointed out in the claim.

The principal object of the invention is to provide a gapping machine in which the rings are continuously fed to the cutter from a loading bar that will insure such precision in the operation that all the rings will be of the same size after being gap-cut and all gaps will be the same size, at least within tolerances heretofore unobtainable with the old type of gapping machines. The manner in which the object is accomplished, as well as other advantages inherent in the invention, will be better apparent from a detailed description of the invention in connection with the accompanying drawings, in which—

Figure 1:
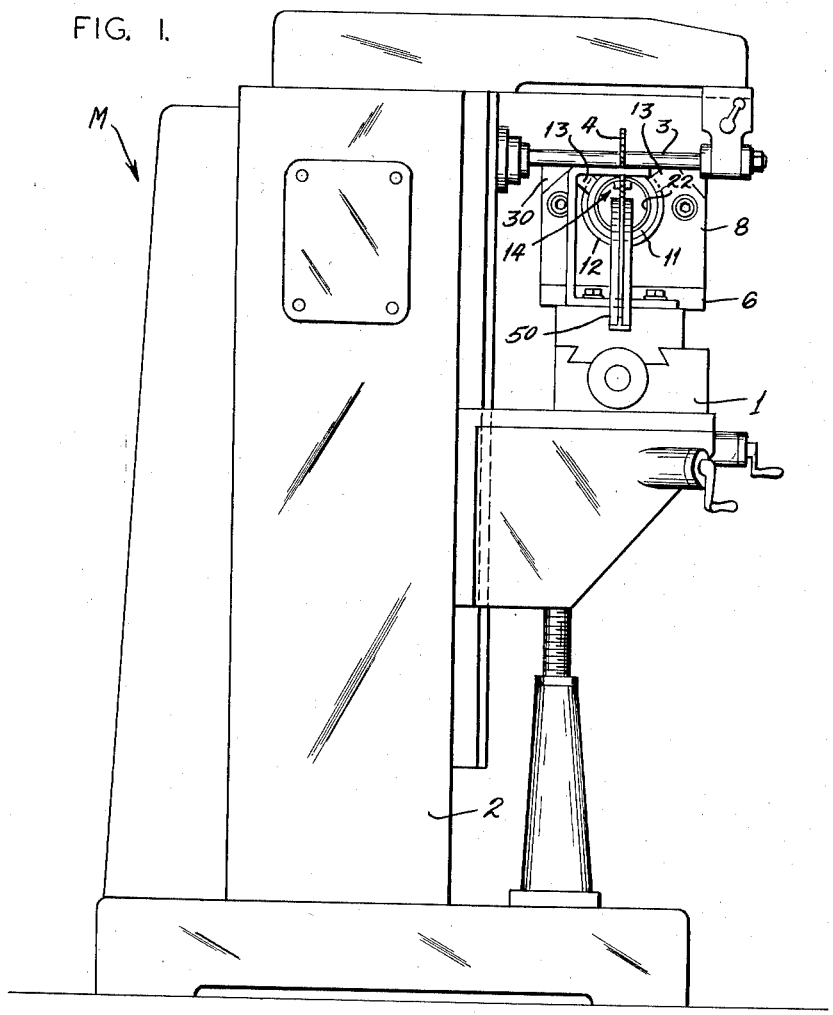
Figure 7:
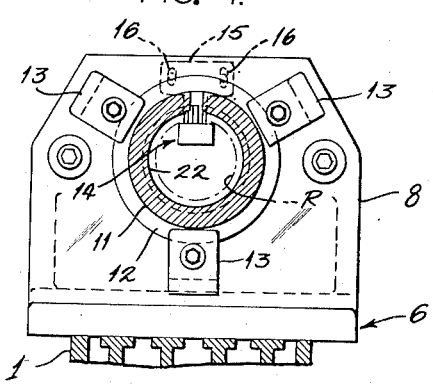
Figure 10:
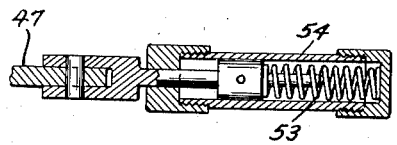
Figure 3:
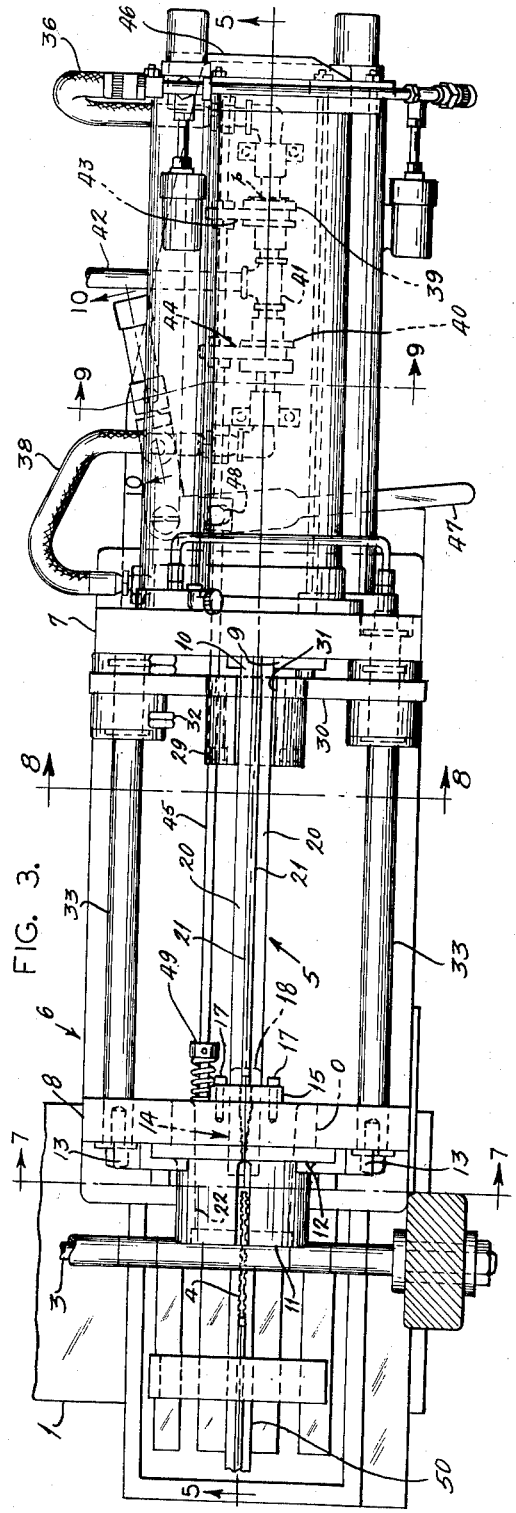
Figure 4:
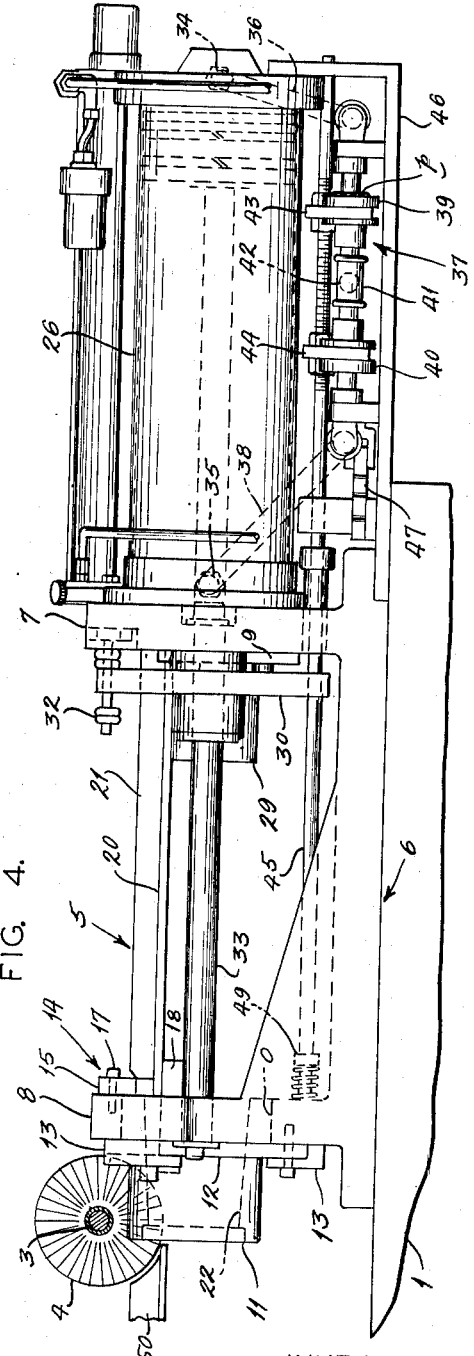
Figure 12:
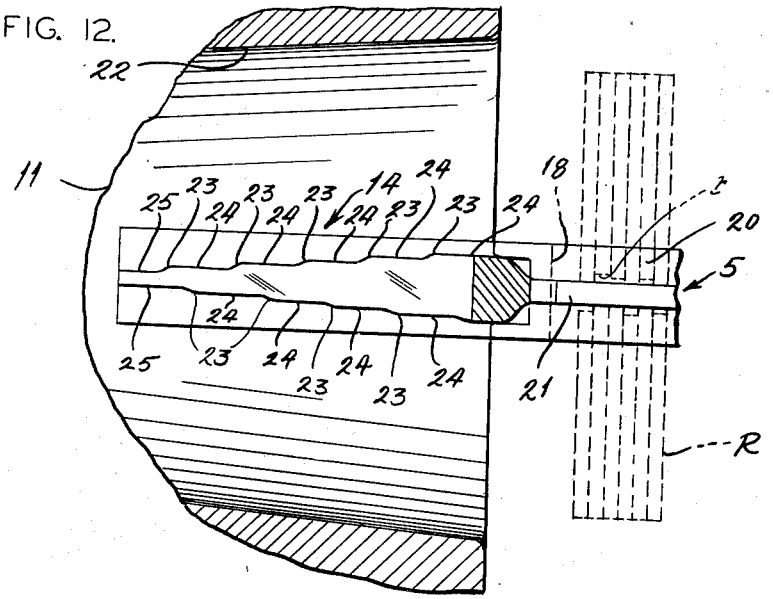
Figure 13:
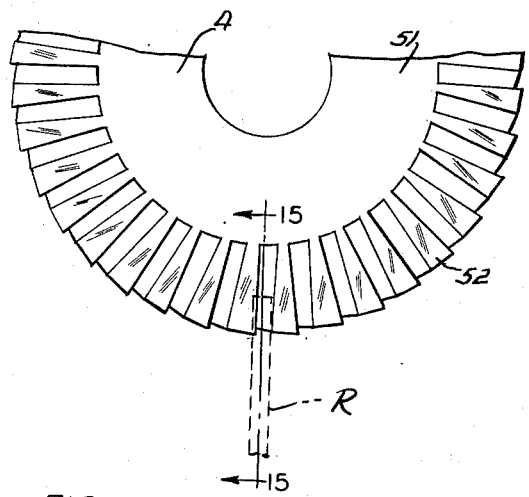
Figure 14:
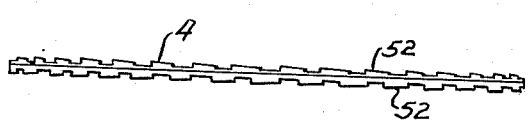
Figure 15:
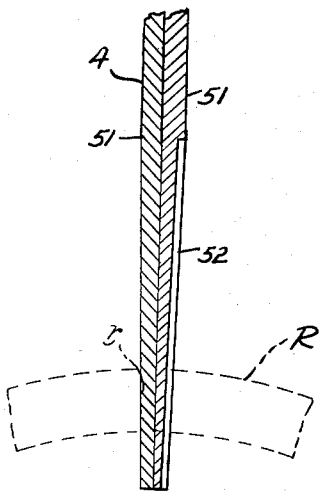

Fig. 1 is a front elevation of a machine on the order of a milling machine with my invention applied thereto; Fig. 2 is a side elevation of the machine showing the invention applied thereto; Fig. 3 is a top plan of my improved piston ring gapping device shown separately from the machine on which it is mounted; Fig. 4 is a side elevation of the gapping device shown in Fig. 3; Fig. 5 is a middle longitudinal section through the gapping device; Fig. 6 is a horizontal section taken on the line 6, 6 of Fig. 5; Fig. 7 is a vertical cross section taken on the line 7, 7 of Fig. 3; Fig. 8 is a cross-section on the line 8—8 of Fig. 3 showing a front end view of the gapping device with its supporting table broken away; Fig. 9 is a cross sectional detail taken on the line 9, 9 of Fig. 3; Fig. 10 is a sectional detail taken on the line 10, 10 of Fig. 3; Fig. 11 is a perspective view of, what we term, a jiggle bar which forms an extension of the ring loading bar; Fig. 12 is a top plan of, what we term, a jiggle bar terminating the guide bar on which the rings are fed to the cutter, rings being shown dotted; Fig. 13 is a face view of a fragment of the gap cutter; Fig. 14 an edge view thereof; and Fig. 15 is a section therethrough on the line 15—15 on Fig. 13.

Referring to the drawings M represents a machine similar to a milling machine in that an adjustable table 1 is carried by a stand 2 above which is mounted a shaft 3 carrying a rotary cutter 4 for cutting gaps in piston rings R slidingly mounted on a loading bar 5 supported in a U-shaped bracket 6. The bracket 6 has spaced uprights 7 and 8, the former being provided with a notched lug 9 to receive the inner end 10 of loading bar 5 and the latter upright having an opening O in which is disposed a sleeve 11 secured in place by a flange 12 and clamps 13, 13. On the inner face of bracket 8 we secure what we term a jiggle bar 14 which has an upstanding flange 15 provided with openings 16, 16 to receive caps screws 17, 17 secured in upright 8. It will be observed that jiggle bar 14 is disposed within sleeve 11 and has an offset 18 to receive the adjacent end 10 of loading bar 5. Thus the loading bar 5 and jiggle bar 14 form a continuous support for the rings R as they are moved through the sleeve 11. The loading bar 5 is T-shaped so the rings R rest on horizontal component 20 of the bar and receive the vertical component 21 in the ring gaps r. It is to be understood that the gaps r are the result of the first gapping operation heretofore performed merely to open the rings so that they may receive their final gapping operation while compressed to their proper size. It is with this final gapping operation that we are concerned.

The inner surface 22 of the sleeve 11 is of a frusto-conical shape, wider where the rings enter the sleeve than where they discharge after being operated on by the gapping cutter 4.

It is important that all the rings R be lined up so that all the ring gaps r are on the same center line as shown in Figure 12 when they approach the cutter 4. This is to insure that the cutter 4 will take the same amount of stock off both ends of all the rings and thereby produce rings having uniform gaps when the rings are compressed to size. The jiggle bar 14 is responsible for this result. By referring to Fig. 12 it will be seen that the bar tapers toward its discharge end by steps 23, 23, 23 etc. connecting adjacent plane faces 24, 24, 24 etc. down to the faces 25, 25 at the narrow end of the bar. As the rings are pushed through the tapered sleeve 11 the ends of ring gaps r are jiggled by contact with faces 24, 24 until the rings come to the end of their travel and encounter the cutter 4. At this time they are compressed to their working diameter. This jiggling action prevents their sticking together by frictional contact and ultimately brings the gaps of all the rings to the cutter 4 with the gaps r on a common center line.

The mechanism for feeding the rings R to the cutter 4 may be of any type known to the art, with electric, hydraulic or pneumatic power. In the drawings we show a pneumatically operated ram comprising a cylinder 26 having a piston 27, and piston stem 28. On the outer end of piston stem 28 are fixed a pusher block 29 and slide plate 30, the latter having a slot 31 to receive loading bar 5 and a buffer 32. There are a pair of guide rods 33, 33 mounted between uprights 7 and 8 over which the slide plate 30 travels when piston 27 is actuated.

The piston 27 is double acting, and cylinder 26 has air ports 34, 35 at its respective ends. Port 34 is connected by a hose 36 to valve assembly 37 and port 35 is connected by a hose 38 to said assembly. A valve 39 controls the flow of air to and from port 34 and a valve 40 controls the flow of air to and from port 35. The valve arrangement is standard construction and no claim is made thereto per se. The valves 39 and 40 are connected by a T 41 to which is connected an air supply pipe 42. Each of the valves are provided with exhaust ports $p$, $p$ (as shown in Figs. 5 and 6).

The valves are actuated by fingers 43, 44 fixed to a valve rod 45 slidably mounted in upright 7 and valve supporting plate 46. A control lever 47 is also mounted on said plate and is pivotally connected by a pin 48 to rod 45 so that when the lever is thrown to the right (dotted Fig. 5) port 34 will be opened to force the piston 27 to the left (Fig. 6) and feed the rings R to cutter 4. When the piston has reached the end of its travel, slide plate 30 will impinge on collar 49 and slide the rod 45 to the left. This will throw lever 47 to the left and at the same time reverse the condition of the valves 39 and 40. The piston now travels back and block 29 and plate 30 assume their rest position so that a new load of rings R may be placed for gapping.

A cushioning spring 53 for the lever 47 is mounted in cylinder 54 (Fig. 10).

After the gapping operation has been performed, the rings R move on to a discharge rail 50 on which they slide to a container C.

It will be observed that the cutter 4 is made of similar sections 51, 51 with the cutting blades 52, 52 arranged in alternation. The blades 52, 52 are wedge shaped in that they taper to a greater thickness toward the center of the cutter (Fig. 15). This enables the operator to regulate the thickness of the gap $r$ in the ring R by moving table 1 up or down so the rings will be gapped nearer the center or the periphery of the blades 52, 52. The taper of the blades 52, 52 not only permits of a variation in the width of the gap $r$ but also insures that the ring ends are cut on a radial line so that when brought together as the ring is compressed the gap will be closed for all practical purposes.

Having described our invention, we claim:

A split piston ring gapping machine comprising a table, a rotary cutter disposed above said table, a ring loading bar carried by said table, means for moving the rings in abutting relation along said bar to the cutter, and opposed step formations near the discharge end of the loading bar for agitating the rings as they approach the cutter, the steps on opposite sides of the loading bar being in staggered relation.

GUSTAVE L. SUNDBERG.
CHARLES A. MARIEN.

REFERENCES CITED

The following references are of record in the file of this patent:

UNITED STATES PATENTS

| Number | Name | Date |
|---|---|---|
| 1,264,461 | Wasson | Apr. 30, 1918 |
| 1,456,925 | Heckmann | May 29, 1923 |
| 1,946,881 | Porter | Feb. 13, 1934 |
| 2,377,960 | Phillips | June 12, 1945 |